March 30, 1954  U. A. MOORES  2,673,616
PIVOTALLY CONNECTED STEERABLE AND DRIVEN TRACTOR UNITS
Filed May 23, 1952  3 Sheets-Sheet 1
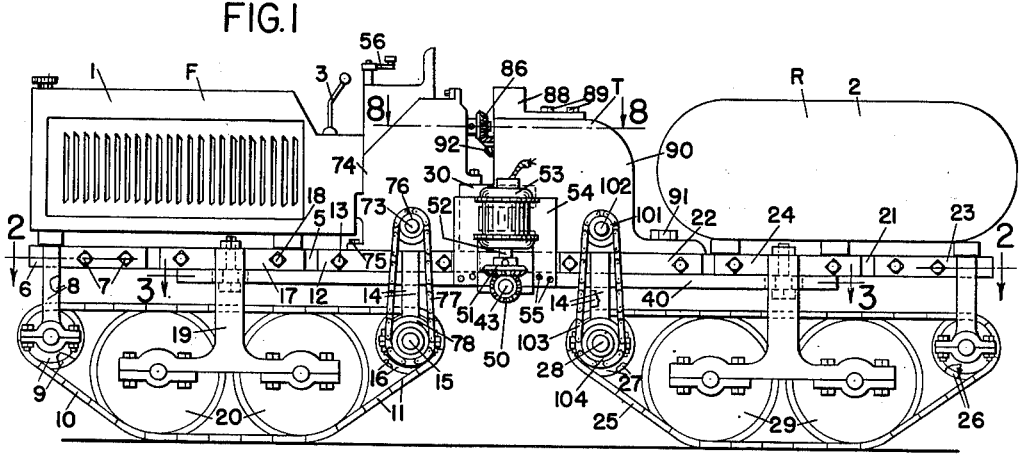
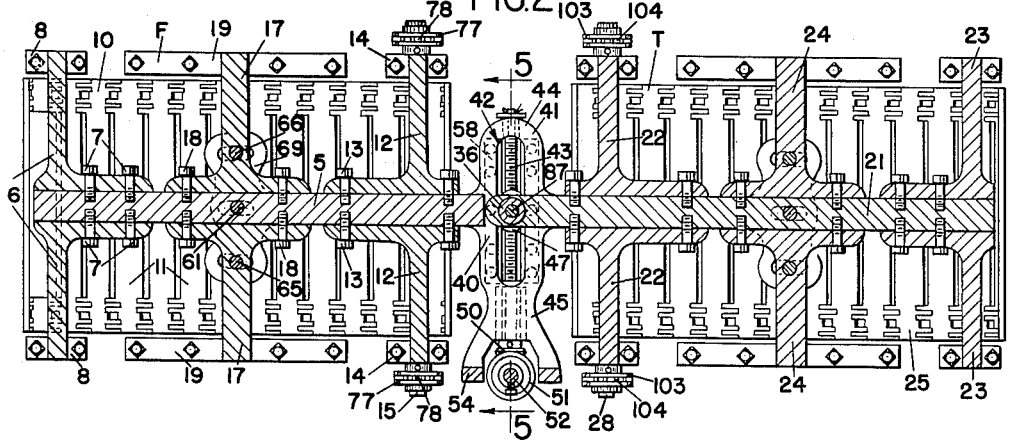
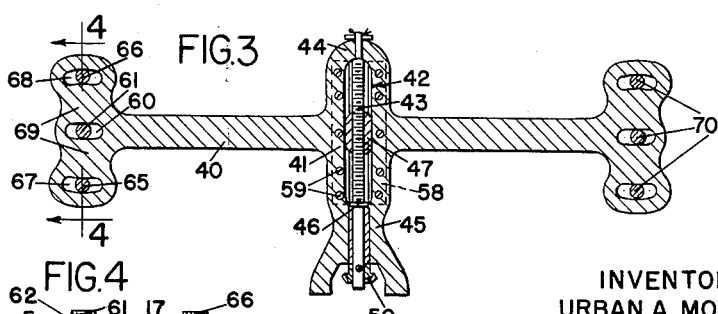
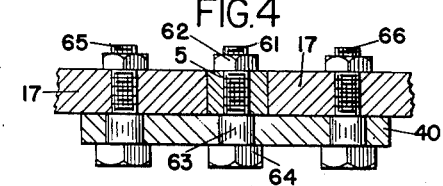
INVENTOR
URBAN A. MOORES
Walter H Wakefield
ATTORNEY March 30, 1954 U. A. MOORES 2,673,616
PIVOTALLY CONNECTED STEERABLE AND DRIVEN TRACTOR UNITS
Filed May 23, 1952 3 Sheets-Sheet 2
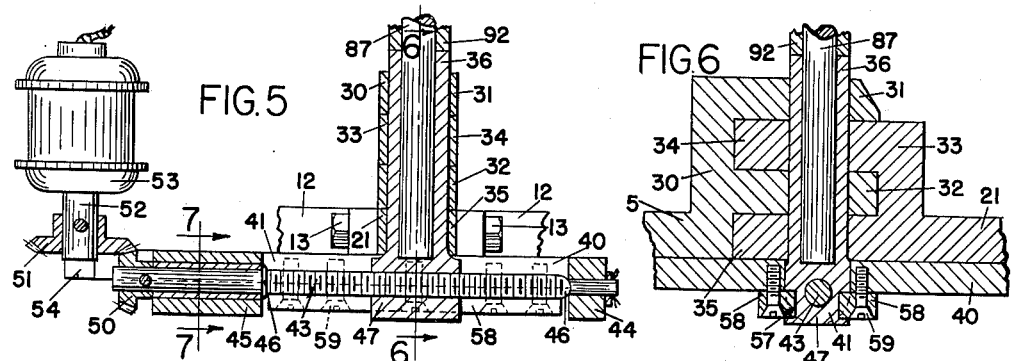
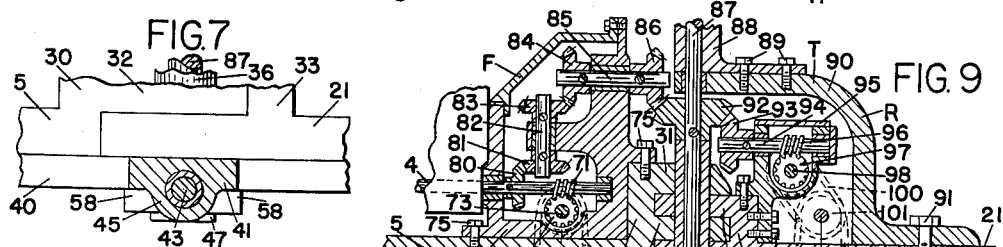
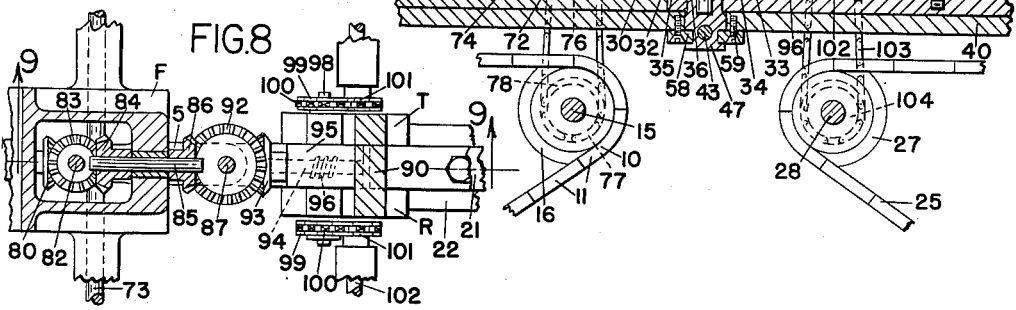
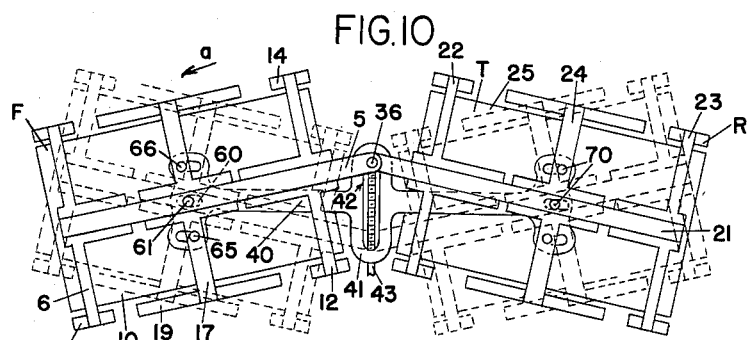
INVENTOR
URBAN A. MOORES
ATTORNEY

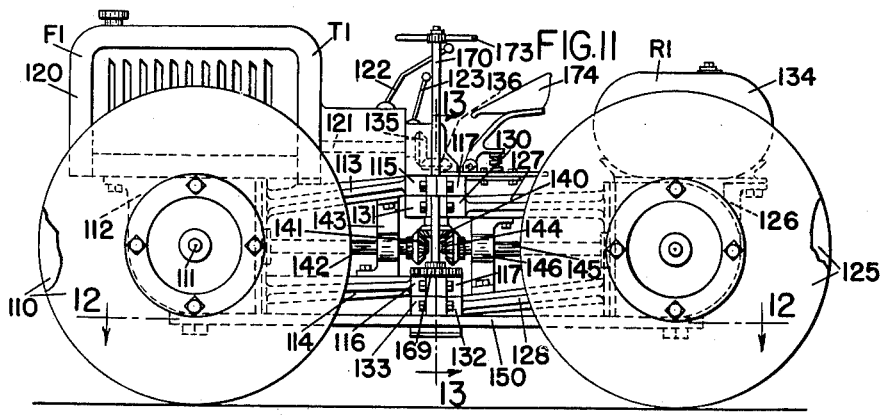
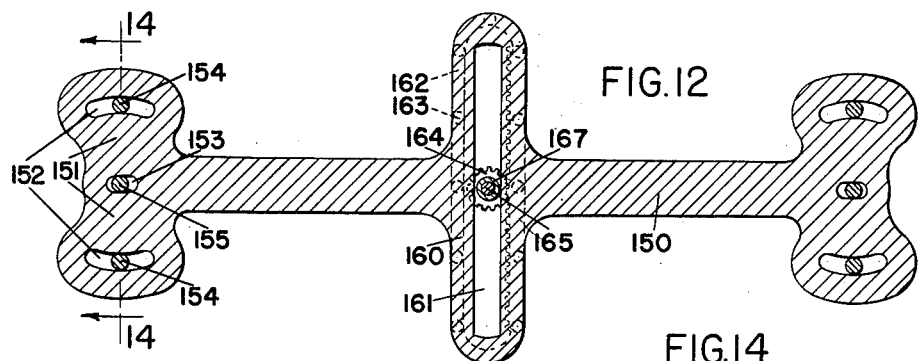
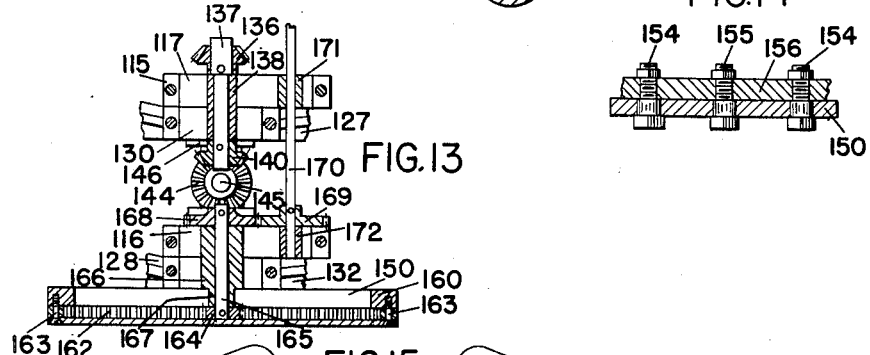
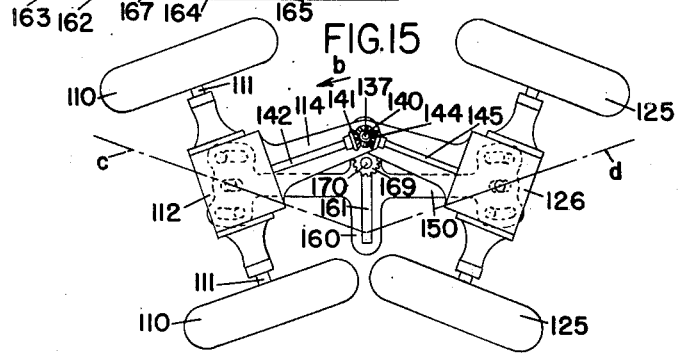
INVENTOR
URBAN A. MOORES

Patented Mar. 30, 1954

2,673,616

UNITED STATES PATENT OFFICE 2,673,616

PIVOTALLY CONNECTED STEERABLE AND DRIVEN TRACTOR UNITS

Urban A. Moores, Rutland Heights, Mass.

Application May 23, 1952, Serial No. 289,465

6 Claims. (Cl. 180—51)

This invention relates to tractors and it is the general obect of the invention to provide a dual tractor the two parts of which are pivoted together around an axis shiftable laterally to effect steering and through which drving power is transmitted.

The coupling together of two tractor units both driven from a single engine usually introduces difficulties of steering, since the two units must be able to move angularly with respect to each other without disturbing the transmission of driving power between the units. In order to overcome this difficulty it is an important object of the present invention to pivot the two units together around a vertical axis and transmit power from a source of power on one unit to the other unit through mechanism having a part which is coaxial with the pivot of the units. Lateral movement of this part of the mechanism while the units are being driven can then be effected to change the angular relation of the units for steering purposes.

It is a further object of the invention to join the two units by a lengthwise support means or member the ends of which are provided with pivots, one for each unit, and the intermediate part of which supports means to shift and guide the aforesaid axis laterally with respect to a line joining the pivots of the units.

It is a further object of the invention to effect lateral shifting of the vertical axis by a motor connected to mechanism which when operated by the motor causes the previously mentioned lateral shift of the vertical axis. The motor is preferably used with heavy duty tractor units the manual steering of which would be difficult. The motor may conveniently be mounted on the aforesaid support member and operate a transverse screw the turning of which under the control of the driver moves the aforesaid part of the power transmitting system.

A further object of the invention relates to a modified form adaptable to lighter duty tractors and provides a manually operable pinion which when turned by the drive rolls along a gear rack on the support member to shift the part of the transmission mechanism rotatable about the axis about which the two tractor units are pivoted.

Other objects will appear as the invention is set forth in the following description.

By way of examples two forms of the invention are shown in the accompanying drawings, wherein:

Fig. 1 is a side elevation of a dual tractor made according to the preferred form of the invention, Figs. 2 and 3 are horizontal sections on lines 2—2 and 3—3, respectively, Fig. 1, Fig. 4 is an enlarged vertical section on line 4—4, Fig. 3, Fig. 5 is an enlarged vertical section on line 5—5, Fig. 2, Fig. 6 is a vertical section on line 6—6, Fig. 5, Fig. 7 is a fragmentary vertical section on line 7—7, Fig. 5, Fig. 8 is an enlarged horizontal section on line 8—8, Fig. 1, Fig. 9 is a vertical section on line 9—9, Fig. 8, showing parts of the endless tread drives for the two tractor units, Fig. 10 is a diagrammatic plan showing the tractor in two different positions for steering in two different directions, Fig. 11 is a side elevation of the modified form of the invention, Fig. 12 is an enlarged horizontal section on line 12—12, Fig. 11, Fig. 13 is an enlarged vertical section on line 13—13, Fig. 11, Fig. 14 is a detail vertical section on line 14—14, Fig. 12, and Fig. 15 is a diagrammatic plan view showing the two units of the modified tractor in position to turn in one direction.

Referring to Figs. 1 and 2, the preferred form of the dual tractor T comprises a front endless tread unit F on which is mounted a driving motor 1, such as an internal combustion engine, and a rear endless tread unit R on which a fuel tank 2 is mounted. A gear shift lever of conventional form is shown at 3 and the engine has a driving shaft 4. The engine may be of usual design and a fuel feed line (not shown) connecting the engine and tank will be constructed as to remain intact when the units turn with respect to each other, as will be described.

Unit F includes a horizontal chassis member 5 under the engine and having oppositely etxending front arms 6 secured thereto by bolts 7. Depending from the arms 6 are bearing members 8 for idler sprocket wheels 9 for an endless tread lag chain 10. Tranverse lags 11 forming part of the linked endless tread chain adapt the tractor unit for travel over soft terrain. Rear oppositely extending arms 12 are bolted at 13 to member 5 and have depending bearing members 14 which support a transverse chain driving shaft 15. Chain driving sprocket wheels 16 are secured to shaft 15 and are the means by which the endless tread chain is driven.

Intermediate oppositely extending arms 17 are bolted at 18 to chassis member 5 and have depending bearing members 19 one of which is shown in Fig. 1. Unit supporting wheels 20 are journaled on member 19 and mesh with the endless tread chain 10 as will be apparent from Fig. 1.

The rear unit R is similar to unit F and has a horizontal chassis member 21 under the tank 2 and has rear arms 22, front arms 23 and intermediate arms 24 similar, respectively, to arms 6, 12 and 17 of unit F. A rear endless tread lag chain 25 is trained around idler sprocket wheels 26 similar to wheels 9 and driving sprocket wheels 27 secured to chain driving shaft 28 similar, respectively, to parts 16 and 15. Unit R has supporting wheels 29 similar to wheels 20. The tank 2 is supported in any approved manner on the chassis member 21 and arms 24, and similarly, the engine is appropriately supported by chassis member 5 and arms 17.

The two units F and R are pivotally connected as shown in Fig. 9. The chassis member 5 is made with a pivot head 30 formed with upper and lower bearings 31 and 32, respectively, and the chassis member 21 has a pivot head 33 formed with an upper bearing 34 which fits closely between bearings 31 and 32. A lower bearing 35 on head 33 fits under bearing 32 and a vertical tube or sleeve member 36 passing through bearings 31, 32, 34 and 35 serves to connect the units F and R pivotally.

A support member or plate 40, see Figs. 2 and 3, has a central transverse part 41 formed with a guide slot 42 extending vertically through said part and preferably at right angles to the length of the guide plate. A screw 43 is located in slot 42 and has its ends rotatably mounted in bearings 44 and 45 at opposite ends of the slot. The screw is free to turn in these bearings but is held against endwise movement by shoulders 46 which engage the bearings 44 and 45. The lower end of tube 36 is formed with a hub 47 through which screw 43 is threaded, see Fig. 5.

As shown in Fig. 5 the left hand end of the screw member 43 has secured thereto a bevel gear 50 which meshes with a second bevel gear 51 secured to shaft 52 of an electric motor 53. Support plate 40 has a frame 54 fastened thereto at 55 and the motor 53 is mounted on this frame so that the motor is fixed with respect to the support plate. The electric motor is reversible and is controlled from a switch handle 56 shown in Fig. 1. The electric circuits for the motor are not shown, nor is the source of electric power to drive it, and it is thought sufficient to state that the usual storage battery and conventional wiring will enable the drive of the dual tractor to cause the motor 53 to turn in either direction or be at rest.

Opposite sides of hub 47 are preferably grooved at 57 to receive guide rods 58 extending along slot 42 and fastened to the under side of support plate by screws 59, see Fig. 6. The left end of the support plate as shown in Fig. 3 has a short straight slot 60 therein which receives a king pin bolt 61 the upper end of which is tapped into chassis member 5 and held by nut 62, see Fig. 4. The king pin has a cylindrical bearing part 63 fitting the slot 60 and a head 64 which holds the guide plate closely against the under side of the chassis member. Two other bolts 65 and 66 similar to the king pin extend through arcuate slots 67 and 68, respectively, in lateral arms 69 on chassis member 5. These bolts are tapped into the oppositely extending arms 17. The opposite end of support 40 is similar to the left end, Fig. 3, and has bolts 70 similar to bolts 61, 65 and 66. The parts just described permit the units F and R to move angularly in a horizontal plane with respect to the support plate 40 when the tube 36 is moved due to turning of screw 43 by motor 53.

Power is transmitted from the engine 1 to the endless tread chain driving sprockets by the mechanism shown in Figs. 8 and 9. The engine drive shaft 4 has secured thereto a worm 71 meshing with a worm gear 72 secured to a cross shaft 73 rotatable on a bearing block 74 fastened at 75 to the chassis member 5 and its head 30. Chain sprockets 76 secured to the ends of shaft 73 mesh with chains 77, one of which is shown in Fig. 9, which in turn drive sprockets 78 secured to the ends of shaft 15. The train 71—78 thus provides driving means for the lag chain of the front unit F.

A mitre gear 80 secured to shaft 4 meshes with a second mitre gear 81 pinned to the bottom of a short vertical shaft 82 rotatable in bearing block 74 and having another mitre gear 83 secured to the upper end thereof. Gear 83 meshes with a mitre gear 84 secured to a short horizontal shaft 85 rotatable in bearing block 74 and having a mitre gear 86 secured to the right end thereof, see Fig. 9.

A vertical driving shaft 87 rotates within the tube or sleeve 36 as a lower bearing and has an upper bearing 88 secured at 89 to a stand 90 fastened at 91 to the rear chassis member 21. Shaft 87 is therefore rotatable about the vertical axis along which the units F and R are pivoted together. Shaft 87 has secured thereto a double mitre gear 92 the upper part of which meshes with gear 86 and the lower part of which meshes with mitre gear 93 pinned to a horizontal worm shaft 94 rotatable in a bearing housing 95 secured at 96 to pivot head 33. Shaft 94 has a worm 96 meshing with a worm wheel 97 secured to a short cross shaft 98 turning in bearing 95. Sprocket wheels 99 on shaft 98 drive short chains 100 which in turn drive sprockets 101 on a cross shaft 102 rotatable in bearing members 14 on arms 23. Chains 103 meshing with sprockets 101 and sprockets 104 secured to shaft 28 convey driving force to the lag chain for the rear unit R.

From the matter thus far described it will be understood that when the units F and R are aligned with the tube 36 and vertical shaft 87 substantially centrally located with respect to slot 42, as suggested in Fig. 2, the dual tractor will move straight ahead. If the driver wishes to turn to the left when traveling in the direction of arrow a, Fig. 10, he will move switch handle 56 in a direction to cause the motor 53 to turn screw 43 in such a direction as will move the sleeve 36 and shaft 87 to the right end of slot 42 and the units F and R will then be in the relative position shown in full lines, Fig. 10. If a right hand turn is desired the motor 53 will be caused to turn in the opposite direction and the units will then be as indicated in dotted lines, Fig. 10. The turning can be regulated by the length of time the electric motor is running as determined by the operator manipulating switch handle 56. During turning of the dual tractor power is transmitted through double mitre gear 92 to the lag chain of the rear unit R.

In the modified form of the invention shown in Figs. 11–15 the two units are mounted on wheels and the steering is effected by moving the vertical axis of the power transmission mechanism by manually operated means.

Referring to Fig. 11, the front unit F1 comprises wheels 110 on axles 111 rotated by a differential mechanism represented at 112. Secured to and extending rearwardly from mechanism 112 are upper and lower chassis members 113 and 114, respectively, the rear ends of which are provided with vertically aligned bearings 115 and 116, respectively. These bearings are of the split type and include rear cap bearing members 117.

The source of power, as engine 120 similar to engine 2, is supported by differential mechanism 112 and upper chassis member 113 and has a driving shaft 121, a gear shift lever 122, and a clutch lever 123, all of usual construction.

The rear unit R1 has wheels 125 driven by a differential mechanism 126 to which are secured forwardly extending upper and lower chassis members 127 and 128, respectively. Member 127 has a bearing 130 below and vertically aligned with bearing 115. Bearing 130 is also of the split type and has a cap member 131. The lower chassis member 128 has a bearing 132 below and vertically aligned with bearing 116 and provided with a cap bearing member 133. A fuel tank 134 is mounted on the differential mechanism 126.

The engine driving shaft 121 has secured thereto a mitre gear 135 meshing with a mitre gear 136 secured to a short vertical shaft 137, see Fig. 13, rotatable in a sleeve 138 in the upper bearings 115 and 131. A mitre gear 140 secured to the lower end of shaft 137 meshes with a mitre gear 141 secured to a shaft 142 extending forwardly to the differential mechanism 112. Shaft 142 is supported in a bearing member 143 which is secured to and braces chassis members 113 and 114, see Fig. 11. Mitre gear 140 also meshes with mitre gear 144 secured to a rearwardly leading shaft 145 connected to differential mechanism 126. This shaft has a bearing member 146 similar to part 143 and secured to and bracing chassis members 127 and 128. When engine 120 is running power is transmitted through the gearing and shafts just described to drive the wheels 110 and 125.

The two units F1 and R1 are joined by a support member 150 somewhat similar to the support member of the preferred form. This member has arms 151 at its left end, Fig. 12, formed with arcuate slots 152 and a short straight longitudinal slot 153. These slots have passing through them screws 154 and a king pin 155 formed as a screw. The screws 154 and 155 are essentially the same as those described for the preferred form of the invention and are tapped into the bottom plate 156 of the differential mechanism 112. The right hand end of support member 150 is similar to the left hand end and is similarly connected to the differential mechanism 126.

Support 150 has a part 160 intermediate its ends extending transversely thereof and formed with a guide slot 161. A gear rack 162 is secured at 163 to the underside of part 160 at one side of slot 161. This gear rack meshes with a pinion 164 secured to the lower end of a short vertical steering shaft 165 coaxial with shaft 137 and rotatable in a sleeve or bushing 166 fitting into and pivotally connecting the lower bearings 116 and 132. Bushing 166 has a reduced lower end 167 which fits into and is guided by slot 161.

The upper end of shaft 165 has secured thereto a gear 168 meshing with another gear 169 secured to the lower end of a steering post 170. This post is rotatable in vertically aligned side bearings 171 and 172 on main bearings 115 and 116, respectively, and has a steering wheel 173 secured to its upper end accessible to a driver in seat 174. The seat is shown in Fig. 11 as being mounted on the top bearing 115, but this is not the only way in which it can be supported.

When the modified dual tractor T1 is moving ahead in a straight line the shaft 165 will be as indicated in Fig. 12, that is, substantially in alignment with the king pins 155 and midway of the length of slot 161. Under these conditions power from the engine driving shaft will be transmitted through vertical shaft 137 to the horizontal shafts 142 and 145 and thence to their respective differential mechanisms and wheels.

If a turn is to be made to the left when traveling in the direction of arrow b, Fig. 15, steering wheel 173 will be turned in a direction to move pinion 164 toward the right hand end of slot 161 to some such position as shown in Fig. 15. Since the steering shaft 165 is vertically aligned with the power shaft 137 and the chassis members are rigid with their respective units the latter will be turned to the position shown in Fig. 15. If it be desired ot make a right hand turn the steering wheel will be rotated to move the steering shaft 165 toward the opposite end of slot 161 so that the units will be in positions suggested by dot and dash lines c and d, Fig. 15. During the turning operations the steering wheel and seat 174 will move transversely with the bearings for the chassis members.

It may be noted that in both forms of the invention guide means for the common axis of the units is provided at right angles to the line which joins the sliding pivotal connections for the two units, the screw being this guide means in the preferred form and the rack serving this function in the modified form. This right angle relation is shown clearly in Figs. 3 and 12 and results in an equal sliding of each unit on its sliding connection so that both units will move the same angular amount when the steering mechanism moves along the guide means.

From the foregoing it will be seen that the invention sets forth a dual tractor the units of which are pivoted together about an axis along which driving power is transmitted to drive at least one of the units. Steering means shifts this axis laterally to effect right or left hand turning and power is transmitted to both units during the steering operation. In the preferred form a motor is utilized to cause lateral shifting of the pivot of the two units, whereas in the modified form the pivot is moved manually. Both forms employ an elongated support member the ends of which are pivotally connected to the units and the central part of which has means for guiding the vertical axis about which the units are pivoted and along which driving power is transmitted. In the form shown in Fig. 11 the steering wheel and seat move laterally with the vertical axis.

Having now particularly described and ascertained the nature of the invention and in what manner the same is to be performed, what is claimed is:

1. In a dual tractor, a pair of similar tractor units each having road engaging means to be moved for propulsion purposes, a vertical sleeve member serving as a common pivot for said units, a source of power on one of said units, power transmission means supported in part by each unit and driven by said source of power and operatively connected to each road engaging means and including a vertical shaft supported in part by and rotatable within said sleeve member, support means carried jointly by said units and having a sliding pivotal connection with each unit, and steering means including a screw screw-threaded through a part of said sleeve member and mounted on the support means and capable when turned of moving said sleeve member and shaft at right angles with respect to a line joining said pivotal connections to move each unit about the sleeve member to change the angular relation of said units relative to said line while said shaft is rotating.

2. The dual tractor set forth in claim 1 wherein said support means is formed with a guide slot transverse of said line along which said part of the sleeve member is movable and the axis of said sleeve member passes through the axis of said screw.

3. The dual tractor set forth in claim 1 wherein said shaft of the power transmission means is coaxial with said sleeve member and has secured thereto a gear meshing with a gear on one of said units and meshing also with another gear on the other unit.

4. In a dual tractor, a pair of similar tractor units pivoted together about a common vertical axis and each unit having road engaging means to be moved for propulsion purposes, a source of power on one of said units, power transmission means supported in part by each unit and driven by said source of power and operatively connected to each road engaging means and including a vertical shaft rotatable about said axis, support means carried jointly by said units and having a sliding pivotal connection with each unit, a straight rack on said support means extending transversely of the dual tractor at right angles to a line joining said pivotal connections, and a gear meshing with said rack coaxial with said shaft of the transmission means and effective when rolled along said rack to move said axis and shaft at right angles to said line to change the angular relation of said units about said axis and cause each unit to slide with respect to the sliding connection therefor on said support means to the end that both units will turn substantially equal angular amounts relatively to said line.

5. In a dual tractor, a pair of similar tractor units pivoted to each other about a common vertical axis, support means extending from one unit to the other unit and having a sliding pivotal connection with each unit, guide means on the support means transverse thereof and at right angles to a line joining said pivotal connections, each unit being movable about the pivotal connection thereof relatively to said support means, steering means operatively interposed between said support means and said units movable along said guide means to move said vertical axis at right angles to said line and move said units angularly relatively to said support means and slidingly with respect to their respective pivotal connections, and power transmission means to transmit driving power from one of said units to the other unit through said axis for all angular positions of the units relative to said support means.

6. The dual tractor set forth in claim 5 wherein the transmission means includes a shaft coaxial with said axis and movable by said steering means at right angles to said line and having secured thereto a gear coaxial therewith meshing on opposite sides thereof with two gears in said transmission means, one of said two gears being supported by one unit and the other of said two gears being supported by the other unit.

URBAN A. MOORES.

References Cited in the file of this patent

UNITED STATES PATENTS

| Number | Name | Date |
|---|---|---|
| 915,058 | Summers | Mar. 9, 1909 |
| 1,126,229 | King et al. | Jan. 26, 1915 |
| 1,353,848 | Pavesi | Sept. 28, 1920 |
| 1,364,817 | Slocum | Jan. 4, 1921 |
| 1,416,329 | Blodgett | May 16, 1922 |
| 1,623,214 | Storey | Apr. 5, 1927 |
| 2,232,165 | Cochran | Feb. 18, 1941 |
| 2,252,610 | Behl | Aug. 12, 1941 |